Nov. 26, 1963  D. L. FITTON ETAL  3,111,900
MISSILE INTERSTAGE SEPARATING DEVICE
Filed March 30, 1961
FIG. 1
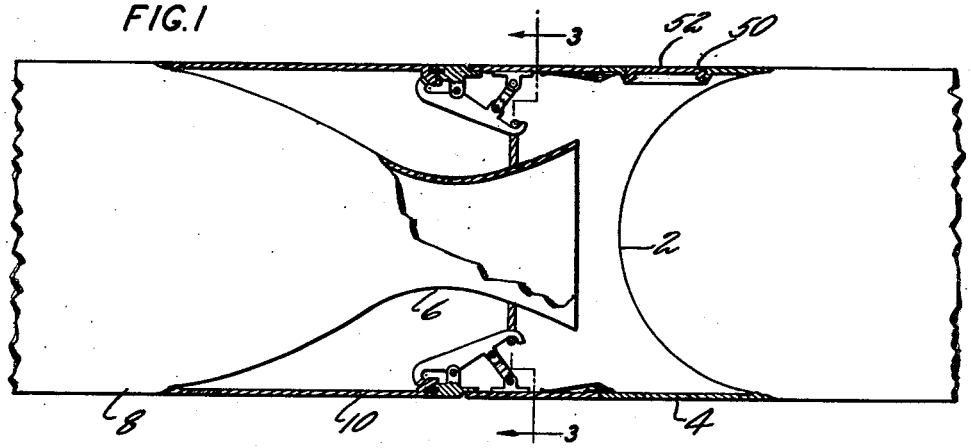
FIG. 2
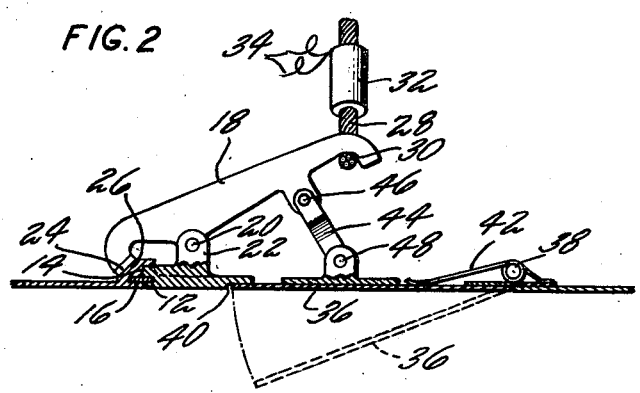
FIG. 3
INVENTORS
DAVID L. FITTON
GEORGE A. LAWSON
BY Charles A. Warren
ATTORNEY United States Patent Office 3,111,900
Patented Nov. 26, 1963

3,111,900
MISSILE INTERSTAGE SEPARATING DEVICE
David L. Fitton, Hazardville, Conn., and George A. Lawson, Sturbridge, Mass., assignors to United Aircraft Corporation, East Hartford, Conn., a corporation of Delaware
Filed Mar. 30, 1961, Ser. No. 99,630
9 Claims. (Cl. 102—49)

The present invention relates to a device for holding a rocket stage releasably to a space vehicle or for holding adjacent stages of a multi-stage rocket releasably together.

The invention is in certain respects an improvement over the co-pending Hasbrouck et al. application Serial No. 33,255, having the same assignee as this application. The Hasbrouck et al. application describes a latching means releasably holding a rocket stage to a vehicle to provide for jettisoning the rocket stage when desired. The present invention provides, as one feature in conjunction with a latching means of this type, an arrangement for braking the stage to be jettisoned thereby assuring its separation from the vehicle. Another feature of this invention is an interconnection between the latching means and the braking means so that the latching means will be moved into releasing position with the movement of the braking means into braking position.

Other features and advantages will be apparent from the specification and claims, and from the accompanying drawing which illustrates an embodiment of the invention.

FIG. 1 is a fragmentary longitudinal sectional view through a portion of a multi-stage rocket showing the invention.

FIG. 2 is an enlarged longitudinal sectional view showing the latching means and braking means in greater detail.

FIG. 3 is a transverse sectional view substantially along the line 3—3 of FIG. 1.

The invention is shown as applied to a multi-stage rocket in which the first stage is represented by the head 2 of the combustion chamber. The first stage carries a substantially cylindrical forwardly projecting sleeve 4 which surrounds the nozzle 6 of the second stage rocket or vehicle 8. The vehicle 8 carries a rearwardly projecting sleeve 10 substantially equal in diameter to the sleeve 4 and engaging endwise with the sleeve to hold the rocket stages in axial spaced relation. These sleeves 4 and 10 have cooperating radial surfaces 12 and 14 which interengage and which transmit the thrust of the first stage rocket to the remainder of the vehicle. These surfaces may be held in alignment by one or more dowel pins 16, FIG. 2, if desired.

The sleeves 4 and 10 are held together axially by a plurality of latching levers 18. Each lever is pivotally supported by a pin 20 on a bracket 22 mounted on the inner surface of the sleeve 4. The forward end of each lever engages with an obliquely positioned surface 24 carried by the sleeve 10. The end of the lever has a cooperating surface 26 to engage with the surfaces 24. With the levers in the position shown in FIG. 2, the sleeves 4 and 10 are held securely together and are prevented from separating axially by these levers.

The several levers 18 are held in the locking position of FIG. 2 by a cable 28, FIGS. 2 and 3, which extends around the downstream ends of the levers, the cable being received in notches 30 in the levers. With the parts in the arrangement shown a relatively small tension in the cable 28 will hold the levers in locking position. The oblique surfaces 24 and 26 are so positioned that when the levers are released the wedging action will tend to move the levers into released position as the sleeves move apart.

One or more explosive links 32 may be incorporated in the cable 28 so that when separation of the rocket stage to be jettisoned is desired the explosive links 32 may be broken as by an electrical impulse supplied by power leads 34. This will release the levers so that they will be free to turn in a direction to disengage the cooperating surfaces 24 and 26. This will involve with respect to the lever shown in FIG. 2 a clockwise movement.

In order to provide a braking action on the rocket stage 2 which is to be jettisoned the sleeve 4 has positioned in the wall thereof one or more drag flaps 36. Each flap is pivotally mounted on hinge pin 38 at its downstream end and in the inoperative position of FIG. 2 the flap is positioned within an opening 40 provided in the sleeve 4. A spring 42 normally urges the drag flap to the open or operative position shown in the dot-dash lines in FIG. 2. In this position the atmosphere surrounding the rocket will exert a substantial braking effort on the flap which will carry the rocket stage 2 away from the remainder of the vehicle.

The flap 36 is normally held in the inoperative position by a link 44 which connects the flap to one of the levers 18, this link being pivotally attached to the lever by a pin 46 and to the flap by a pin 48. Thus, so long as the cable 28 is operative to hold the levers in the operative position of FIG. 2, the drag flap will be in the inoperative position of FIG. 2. When the restraining cable 28 is released the spring 42 will urge the drag flap into the braking position and will carry with it the associated lever 18 thereby placing the lever in unlatched position. Although only one flap is shown, it will be understood that a plurality of flaps may be provided so that the braking action may be uniform around the periphery of the rocket stage.

A suitable manhole 50 with a closure plate 52 may be provided in the sleeve 4 for access to the levers and cable in assembling the rocket stages.

It is to be understood that the invention is not limited to the specific embodiment herein illustrated and described, but may be used in other ways without departure from its spirit as defined by the following claims.

We claim:

1. Locking means for holding a vehicle and a rocket stage in assembled relation, said vehicle and stage having cooperating sleeves thereon, said sleeves having end surfaces in endwise engagement to hold said vehicle and stage in predetermined axial relation, said locking means including a plurality of levers pivoted on the inner surface on one of said sleeves, each lever having at one end means engaging the other sleeve to hold said sleeves together, releasable means engaging the opposite ends of said levers to hold the levers in operative position with said one end of each lever in engagement with said other sleeve, a flap pivoted in one of said sleeves and movable into an operative position externally of said sleeve and means connecting said flap to one of said levers to cause said flap to move with said lever.

2. Locking means as in claim 1 in which a spring acting on the flap normally urges the flap into said operative position.

3. Locking means as in claim 1 in which the connecting means is a link pivoted to said lever and said flap.

4. Locking means as in claim 1 in which said one of said sleeves has an opening therein to receive said flap.

5. Locking means as in claim 1 in which the flap is held within said one of said sleeves when said levers are in operative position.

6. Attachment means between successive rocket stages in which the stages have aligned sleeves in end-to-end engagement, the attachment means including a plurality of levers pivoted on one of the sleeves, the other sleeve having a shoulder thereon, each lever having at one end a clamping part engaging with said shoulder to hold said sleeves in end-to-end engagement, means engaging with said levers for releasably retaining said levers in engagement with said shoulder, a flap pivotally mounted in one of said sleeves and resiliently urged into open position externally of the sleeve and means connecting said flap to one of said levers to hold the flap in closed position in the sleeve when the associated lever is in a clamping position.

7. Attachment means as in claim 5 in which a spring acting on the flap resiliently urges the flap into open position.

8. Attachment means as in claim 5 in which the flap and the associated lever are interconnected by a link pivotally attached at opposite ends to the flap and the associated lever respectively.

9. Attachment means as in claim 5 in which the flap and the associated lever are interconnected by a link pivotally attached at opposite ends to the flap and the associated lever respectively and in which a spring engages with the flap for resiliently urging the flap into open position.

References Cited in the file of this patent
UNITED STATES PATENTS

| | | |
|---|---|---|
| 455,202 | Hampton | June 30, 1891 |
| 2,421,178 | Baker et al. | May 27, 1947 |
| 3,004,489 | Griffith et al. | Oct. 17, 1961 |